(12) United States Patent
Gerö et al.

(10) Patent No.: US 8,102,774 B2
(45) Date of Patent: Jan. 24, 2012

(54) GMPLS BASED OAM PROVISIONING

(75) Inventors: Balázs Peter Gerö, Budapest (HU);
Attila Takács, Budapest (HU); Benoit Tremblay, Laval (CA); Sylvain Monette, Saratoga, CA (US); Joacim Halén, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/810,228

(22) PCT Filed: Jul. 29, 2008

(86) PCT No.: PCT/IB2008/001966
§ 371 (c)(1),
(2), (4) Date: Jun. 23, 2010

(87) PCT Pub. No.: WO2009/016463
PCT Pub. Date: Feb. 5, 2009

(65) Prior Publication Data
US 2010/0290345 A1      Nov. 18, 2010

Related U.S. Application Data (60) Provisional application No. 60/953,273, filed on Aug. 1, 2007, provisional application No. 61/030,752, filed on Feb. 22, 2008.

(51) Int. Cl.
*H04L 12/26* (2006.01)
(52) U.S. Cl. .................................................. 370/236.2
(58) Field of Classification Search ........................ None
See application file for complete search history.

(56) References Cited

U.S. PATENT DOCUMENTS

| | | | |
|---|---|---|---|
| 7,626,947 B2 * | 12/2009 | Bender et al. ................. | 370/255 |
| 7,957,295 B2 * | 6/2011 | Varma et al. .................. | 370/241 |
| 2006/0031480 A1 * | 2/2006 | Nijemcevic et al. .......... | 709/224 |
| 2007/0140126 A1 * | 6/2007 | Osswald et al. ............ | 370/236.2 |
| 2007/0212065 A1 * | 9/2007 | Shin et al. ........................ | 398/45 |
| 2007/0271484 A1 * | 11/2007 | Johansson et al. .............. | 714/39 |
| 2009/0232006 A1 * | 9/2009 | Mohan et al. ............. | 370/241.1 |
| 2011/0164502 A1 * | 7/2011 | Mohan et al. .............. | 370/236.2 |

FOREIGN PATENT DOCUMENTS

EP      1 727 316 A      11/2006

* cited by examiner

*Primary Examiner* — Anh-Vu Ly (57) ABSTRACT

A method and network are described herein for provisioning Operations, Administration, and Maintenance (OAM) entities for a connection when setting-up the connection between an ingress edge node and an egress edge node.

15 Claims, 4 Drawing Sheets

GMPLS BASED OAM PROVISIONING

CLAIM BENEFIT OF PRIOR FILED U.S. APPLICATIONS

This application claims the benefit of U.S. Provisional Application No. 60/953,273, filed Aug. 1, 2007 and U.S. Provisional Application No. 61/030,752, filed Feb. 22, 2008, the disclosure of which is fully incorporated herein by reference.

TECHNICAL FIELD

The present invention relates in general to a method and a network for provisioning Operations, Administration, and Maintenance (OAM) entities for a connection when setting-up the connection between an ingress edge node and an egress edge node.

BACKGROUND

The following abbreviations are herewith defined, at least some of which are referred to within the following description of the present invention.
BFD Bidirectional Forwarding Detection
CCM Connectivity Check Message
CCI Connectivity Check Interval
CFM Connectivity Fault Management
DA Destination Address
ERO Explicit Route Object
ESP Ethernet Switched Path
GELS GMPLS Ethernet Label Switching
GMPLS Generalized Multi-Protocol Label Switching
IEEE Institute of Electrical and Electronics
LTM Link Trace Message
MA Maintenance Association
MAID Maintenance Association Identifier
MAC Media Access Control
MD Maintenance Domain
MEP Maintenance End Point
MEP ID MEP Identifier
MHF MIP Half Function
MPLS Multi-Protocol Label Switching
OAM Operations, Administration, and Maintenance
P2P Point-to-Point
P2MP Point-to-MultiPoint
PBB Provider Backbone Bridge
RDI Remote Defect Indicator
RSVP-TE Resource Reservation Protocol-Traffic Engineering
SA Source Address
SDH Synchronous Digital Hierarchy
TLV Type-Length-Value
VID VLAN Identifier
VLAN Virtual Local Area Network The following references provide some background information which is related to the discussion about the present invention. The contents of the following references are hereby incorporated by reference herein.
1. [Fedyk-GELS-PBBTE] D. Fedyk et al. "GMPLS control of Ethernet", Internet Draft, work in progress, May 2007.
2. [GELS-Framework] T. Nadeau "GMPLS Ethernet Label Switching Architecture and Framework", Internet Draft, work in progress, Oct. 22, 2007. [GELS-Framework] and [Fedyk-GELS-PBBTE] are extending the GMPLS control plane to support the establishment of point-to-point PBB-TE data plane connections. GMPLS established PBB-TE connections are referred to herein as Ethernet LSPs. GELS enables the application of MPLS-TE and GMPLS provisioning and recovery features in Ethernet networks.
3. [GMPLS-OAM] D. Fedyk et al. "OAM Requirements for Generalized Multi-Protocol Label Switching (GMPLS) Networks", Internet Draft, work in progress, Feb. 25, 2008.
4. [IEEE-CFM] "IEEE 802.1ag, Standard for Connectivity Fault Management", Dec. 17, 2007. Ethernet CFM: Defines an adjunct connectivity monitoring OAM flow to check the liveliness of Ethernet networks. OAM refers to a group of network management functions that provide network fault indication, performance information, and data and diagnosis functions.
5. [IEEE-PBBTE] "IEEE 802.1Qay Draft Standard for Provider Backbone Bridging Traffic Engineering", Jun. 19, 2008. [IEEE-PBBTE]: Decouples Ethernet data and control planes by explicitly supporting external control-management mechanisms to configure static filtering entries in bridges and create explicitly routed Ethernet connections. PBB-TE defines mechanisms for 1:1 protection switching of bidirectional Ethernet connections.
6. [RFC3469] "Framework for Multi-Protocol Label Switching (MPLS)-based Recovery", RFC 3469, February 2003.
7. [RFC3471] "Generalized Multi-Protocol Label Switching (GMPLS) Signalling Functional Description", RFC 3471, January 2003.
8. [RFC3473] "Generalized Multi-Protocol Label Switching (GMPLS) Signalling Resource ReserVation Protocol-Traffic Engineering (RSVP-TE) Extensions", RFC 3473, January 2003.
9. [RFC4377] "Operations and Management (OAM) Requirements for Multi-Protocol Label Switched (MPLS) Networks", RFC 4377, February 2006. [RFC4377] provides requirements to create consistent OAM functionality for MPLS networks.
10. [RFC4420] "Encoding of Attributes for Multiprotocol Label Switching (MPLS) Label Switched Path (LSP) Establishment Using Resource Reservation Protocol-Traffic Engineering (RSVP-TE)", RFC 4420, February 2006.

SUMMARY

In one aspect, the present invention provides a method for setting-up connectivity monitoring of a connection between a first edge node and a second edge node in a network. The method includes the steps of extending connection setup procedures used to establish the connection between the first edge node and the second edge node to also provision a connectivity check functionality by establishing a first connectivity check mechanism (e.g., first MEP) at the first edge node and a second connectivity check mechanism (e.g., second MEP) at the second edge node. The first connectivity check mechanism and the second connectivity check mechanism are used to monitor a connectivity of the connection between the first edge node and the second edge node. The extension of the connection setup procedures allows for the automatic configuration of parameters used to establish the connectivity check mechanisms to be piggybacked on the connection setup signaling between the first edge node and the second edge node (note: the connectivity check functionality described herein includes connectivity monitoring and performance monitoring). The present invention addresses unidirectional ESPs and unidirectional LSPs plus other types of connections as well since it is also applicable to other technologies like MPLS and SDH in addition to the Ethernet technology.

In another aspect, the present invention provides an edge node including a processor and a memory that stores processor-executable instructions where the processor interfaces with the memory and executes the processor-executable instructions to extend the connection setup procedures used to establish a connection with a remote edge node to also provision a connectivity check functionality by establishing therein a first connectivity check mechanism (e.g., first MEP) and by enabling the remote edge node to establish a second connectivity check mechanism (e.g., second MEP). The first connectivity check mechanism and the second connectivity check mechanism are used to monitor a connectivity of the connection with the remote edge node. The extension of the connection setup procedures allows for the automatic configuration of parameters used to establish the connectivity check mechanisms to be piggybacked on the connection setup signaling between the edge node and the remote edge node. The present invention addresses unidirectional ESPs and unidirectional LSPs plus other types of connections as well since it is also applicable to other technologies like MPLS and SDH in addition to the Ethernet technology.

In yet another aspect, the present invention provides a network including an ingress edge node and an egress edge node where the ingress edge node includes a processor and a memory that stores processor-executable instructions wherein the processor interfaces with the memory and executes the processor-executable instructions to extend connection setup procedures used to establish a connection with the egress edge node to also provision a connectivity check functionality by establishing therein a first connectivity check mechanism (e.g., first MEP). The egress edge node includes a processor and a memory that stores processor-executable instructions wherein the processor interfaces with the memory and executes the processor-executable instructions to interact with the ingress edge node to establish therein a second connectivity check mechanism (e.g., second MEP). The first connectivity check mechanism and the second connectivity check mechanism are used to monitor a connectivity of the connection between the ingress edge node and the egress edge node. The extension of the connection setup procedures allows for the automatic configuration of parameters used to establish the connectivity check mechanisms to be piggybacked on the connection setup signaling between the ingress edge node and the egress edge node. The present invention addresses unidirectional ESPs and unidirectional LSPs plus other types of connections as well since it is also applicable to other technologies like MPLS and SDH in addition to the Ethernet technology.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
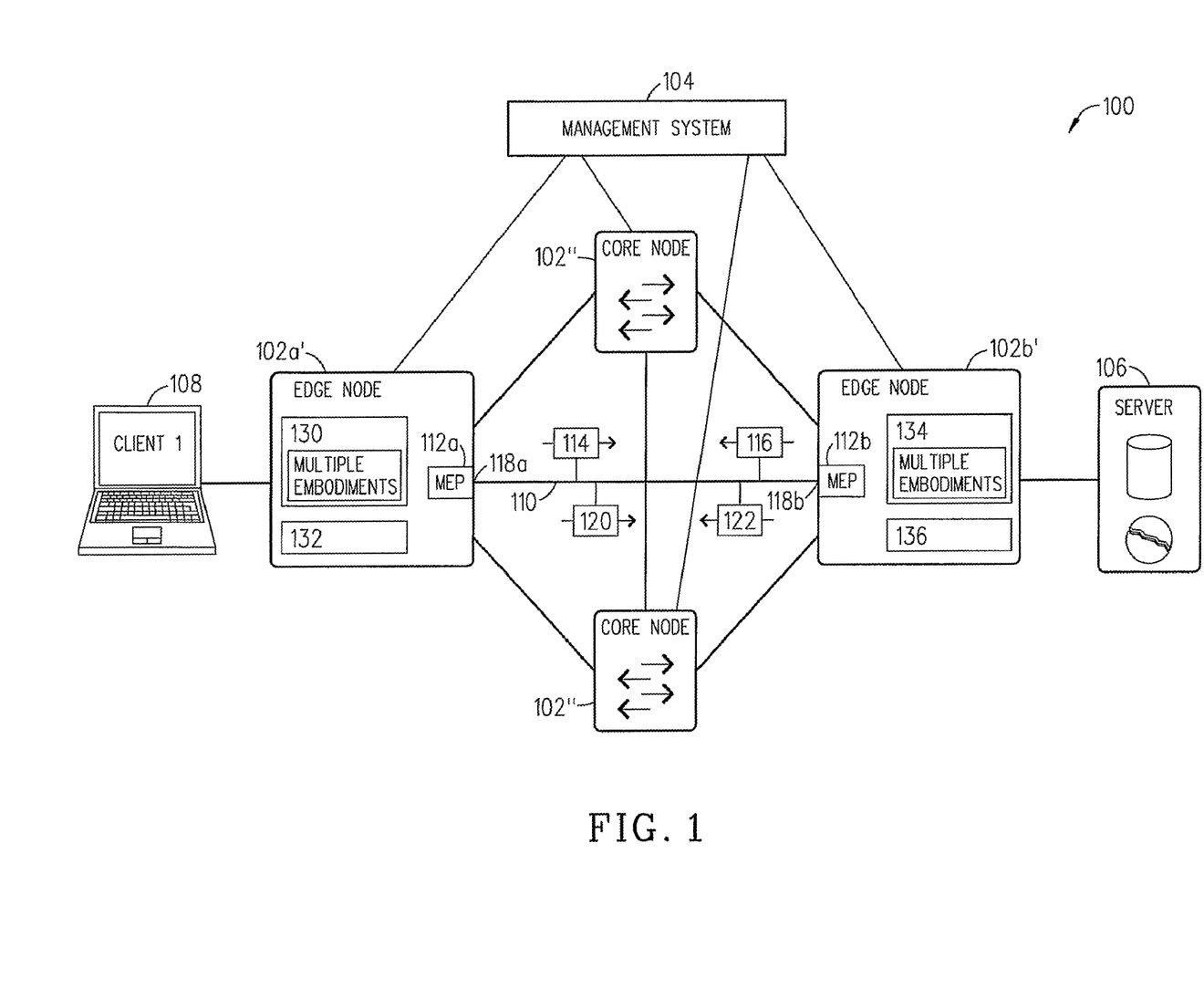
FIG. 1 is a basic diagram of an exemplary network which is used to help explain the different embodiments of the present invention.

Referring to FIG. 1, there is illustrated a basic diagram of an exemplary network 100 which is used to help explain the different embodiments of the present invention. As shown, the network 100 (e.g., GMPLS Ethernet network 100) includes a plurality of interconnected routers 102 (e.g., LSR routers 102) including backbone edge bridges 102' and backbone core bridges 102"). A network management system 104 is connected to each of the interconnected routers 102. In this example, a client 106 (customer network 106) is connected to one backbone edge bridge 102a' and a server 108 (customer network 108) is connected to another backbone edge bridge 102b'. A connection 110 (e.g., bidirectional LSP 110, unidirectional LSP 110) is established between the backbone edge bridges 102a' and 102b'. The backbone edge bridge 102a' is also referred to herein as an ingress edge router 102a', initiating node 102a', or ingress edge node 102a'. The backbone edge bridge 102b' is also referred to herein as an egress edge router 102b', remote node 102b', or egress edge node 102b'. If desired, there may be P2MP LSPs 110 between one ingress edge router 102a' and multiple egress edge routers 102b'. The network 100 could have any number of configurations and could include many other components but for clarity this simple configuration and only those components which are relevant to the present invention have been shown and discussed herein. In addition, the network 100 can have unidirectional ESPs and unidirectional LSPs plus other types of connections as well since it is also applicable to other technologies like MPLS and SDH in addition to the Ethernet technology.

The present invention involves extending the current GMPLS LSP setup procedures to also provision the monitoring of the connectivity of the LSP 110 between the ingress edge router 102a' and the egress edge router 102b'. In one embodiment, the present invention involves extending the current GMPLS LSP setup procedures to provision Ethernet OAM entities like the CC functionality of CFM to monitor the connectivity and health of the LSP 110 between the ingress edge router 102a' and the egress edge router 102b'. This has the benefit that one only needs to initiate the LSP setup procedures and no additional operation is needed to start the monitoring the health of the LSP 110. A brief discussion about the Ethernet OAM operation is provided next and then several different embodiments of the present invention are described.

The use of Ethernet OAM in the present invention typically involves the monitoring of the connectivity of a bidirectional P2P LSP connection 110. It is assumed that the two directions of the bidirectional LSP connection 110 use the same path to allow proper operation of the Link Trace and Loopback Ethernet OAM functionality. To enable the Ethernet OAM, two MEPs 112a and 112b (e.g., connectivity check mechanisms 112a and 112b) are configured at both ends of the bidirectional P2P LSP connection 110 namely at the ingress edge router 102a' and the egress edge router 102b'. The MEPs 112a and 112b once configured periodically exchange CC messages at fixed intervals where the CC messages are used to monitor the connectivity of the corresponding bidirectional P2P LSP connection 110. TABLE #2 identifies the eight distinct fixed intervals that can be used for exchanging CC messages between MEPs 112a and 112b which are currently defined in the standard Ethernet OAM (see reference no. 4 [IEEE-CFM]).

TABLE #2

| # | CCM Interval (CCI) | 3 Bit Reference |
|---|---|---|
| 0 | Invalid | 000 |
| 1 | 3⅓ ms | 001 |
| 2 | 10 ms | 010 |
| 3 | 100 ms | 011 |
| 4 | 1 s | 100 |
| 5 | 10 s | 101 |
| 6 | 1 min | 110 |
| 7 | 10 min | 111 |

Note:
The basic operation of the CFM Connectivity Check functionality is similar to the operation of Bidirectional Forwarding Detection (BFD).

If three consecutive CCM messages are not received by one of the MEPs 112a and 112b, then that MEP 112a or 112b declares a connectivity failure and signals the failure in subsequent CCM messages by setting a Remote Defect Indicator (RDI) bit. If a MEP 112a or 112b receives a CCM message with the RDI bit set then it immediately declares a failure. The detection of a failure may result in triggering protection switching mechanisms or may result in a signal being sent to the management system 104 which then addresses the failure.

The following description provides a detailed explanation about several different embodiments of the present invention in which the current GMPLS LSP setup procedures are extended to also provision OAM functions and in particular the CC functionality of CFM so that the connectivity and health of the LSP 110 can be monitored. TABLE #2 identifies the various parameters used to configure the CFM and the proposed way of setting these parameters so the MEPs 112a and 112b can be established during the setup of the LSP 110 between the ingress router 102a' and the egress router 102b'.

TABLE #2

| OAM parameters | Managed Objects | Configuration |
|---|---|---|
| MD Name | MD | Default |
| MD Level | MD | Default |
| Default MD Level | Default MD | Default |
| MHF Support Flag | Default MD Level, MD, MA | Default |
| Sender ID TLV Control | Default MD Level, MD, MA | Default |
| Network Address of NMS | MD, MA, MEP | Default |
| CCM/LTM Priority | MEP | Default |
| LowestAlarmPri | MEP | Default |
| Alarm Holdoff Timer-fngAlarmTime | MEP | Default |
| Default Timeout-fngResetTime | MEP | Default |
| Primary VID | MEP | Signalled |
| List of the MEP IDs of the MEPs in the MA | MA | Signalled |
| CCMinterval | MA | Signalling/Default |
| CCIenabled | MEP | Signalling |
| List of VIDs Monitored in the MA | MA | Algorithm |
| MA Name | MA | Algorithm |
| Admin State | MEP | Algorithm |
| MEP ID | MEP | Algorithm |
| Bridge Port of IEEE 802.3 Aggregated Port | MEP | Algorithm |
| MEP Direction | MEP | Algorithm |

As can be seen, the CFM parameters have been grouped in three different sets which are based on the way the values are determined:

1. Values preconfigured in the edge nodes 102a' and 102b' either manually or by management. These are default values from the control plane based automatic provisioning point of view. It is assumed that these default values are properly set in each edge node 102a' and 102b'.

2. Values signalled in the control plane at LSP setup through RSVP-TE signalling implicitly or explicitly as described below with respect to the different embodiments of the present invention. For example, there are at least three CFM configuration parameters that could be signalled through RSVP-TE signalling implicitly or explicitly during the setup of the LSP 110 between the edge nodes 102a' and 102b':

2a. Primary VID: The primary VID is signalled at the setup of the LSP 110 in a GENERALIZED_LABEL object as a part of the UPSTREAM_LABEL 200 in a path message 114 and as part of the LABEL in a Resv message 116 signalled between the ingress edge router 102a' and the egress edge router 102b' (see FIGS. 1 and 2). In the case of VLAN+MAC based LSPs 110, the Primary VID parameter and the MAC address should be signalled for use in the CC functionality. For these types of LSPs 110 the MAC address will be part of the UPSTREAM_LABEL 200 and the LABEL, hence it can be determined similarly to the VID value for the Primary VID parameter.

2b. List of MEP IDs of the MEPs in the MA: In case of P2P or P2MP LPSs 110, the identity of the far end or egress edge router 102b' (e.g., root LER 102b') is known and the MEP ID can be derived using an algorithm to derive the MEP's own MEP ID. Alternatively, MEP IDs may require extensions to the RSVP-TE.

2c. CCM interval: May require extensions to RSVP-TE. Alternatively, CCM interval may have a default value but this is not as desirable as using the RSVP-TE signalling.

2d. CCI enabled: May require extensions to RSVP-TE or may be signalled implicitly.

3. Values that can be calculated based on default and signalled parameters. The following describes different ways that can be used to derive these calculated parameters based on algorithms:

3a. List of VIDs monitored by the MA: It is assumed that an LSP 110 has a dedicated single VID and as a result this list has a single element which will be the Primary VID.

3b. MA name: The MA name identifies a Maintenance Association dedicated for the LSP 110. The MA name is unique within an MD level and can be derived from the unique control plane identification of the LSP 110 or can be based on the Primary VID. If the LSP 110 is VLAN+MAC based then the Primary VID and the MAC address should be considered when determining the MA name.

3c. Admin state: The activation of the CC functionality may need coordination at the ingress and egress edge nodes 102a' and 102b'. If the LSP setup message sequence uses RSVP CONF, then connectivity monitoring should be activated at the ingress edge router 102a' on reception of RSVP RESV and at the egress edge router 102b' on reception of RSVP CONF messages. Otherwise, the connectivity monitoring could be activated at the egress edge router 102b' on reception of the RSVP PATH message 114 and at the ingress edge router 102a' on the reception of the RSVP RESV message 116. These solutions assume that MEPs 112a and 112b are able to suppress connectivity alarms before they receive the first CCM frame.

3d. MEP ID: The MEP ID should be derived from the MA name and an ID unique to the node 102a' and 102b' (e.g., based on control plane address). Alternately, since the only requirement of a MEP ID is to be unique within an MA, the MEP ID could be a value representing the role of the node 102a' and 102b' in the LSP signalling (e.g., for p2p LSPs, MEPID:=0 for the ingress edge router 102a' (the node sending the PATH message 114) and MEPID:=1 for the egress edge router 102b' (the node sending the RESV message 116)).

3e. Bridge-node port 118a and 118b: The port 118a and 118b is either explicitly signalled in the ERO or can be identified locally by the nodes 102a' and 102b'.

3f. MEP direction: The MEP 112a and 112b is created on the bridge-node port 118a and 118b. The direction of the MEP 112a and 112b (i.e., Up or Down MEP) can be unambiguously derived based on the local information of the bridge port 118a and 118b.

A detailed discussion is provided next to explain several different embodiments of the present invention relating to how the signalled values identified in TABLE #1 can be signalled using RSVP-TE signalling implicitly or explicitly in the control plane during the setting-up of the LSP 110 so as to establish MEPs 112a and 112b and thus provision the CC functionality which in turn monitors the connectivity and health of the setup LSP 110.

Embodiment No. 1

The CFM Continuity Check functionality can be provisioned without introducing any new RSVP-TE extensions. For instance, the RSVP-TE extensions currently proposed in RFC 3473 (reference no. 8) provide a means to signal parameters to configure end-to-end protection schemes, such as 1+1, 1:1 or OTF reroute. Thus, if Continuity Checks are only used for triggering recovery mechanisms, then the inclusion of objects for an end-to-end protection scheme provisioning at LSP setup implicitly signals the need for connectivity monitoring, i.e. connectivity monitoring has to be enabled (CCI enabled) and CCM interval is set to a default value (e.g., 3.3 ms). That is, this embodiment could use default parameters for CCM intervals and determine Maintenance Association and MEP identification parameters automatically from the LSP identification information. The Primary VIDs and MEP MAC addresses are fetched from the UPSTREAM_LABEL and LABEL RSVP-TE objects. The MEP IDs are set to pre-determined values (e.g. ingress MEP ID=1 and egress MEP ID=2).

This particular solution has a number of drawbacks: (1) it does not provide a way to signal CCM intervals, consequently it does not provide a means to set the CCM interval on a per LSP level, mandating the use of a preconfigured CCM interval, which is undesirable because not all LSP requires the same level of monitoring and setting a CCM interval too short for all LSP may generate too much traffic and overload some of the nodes; and (2) it cannot enable connectivity monitoring for purposes other than for end-to-end protection. Moreover, there is no way for providing additional parameters to configure other aspects of Ethernet OAM, e.g., Performance Monitoring configuration.

Embodiment No. 2

As described above, when the Ethernet LSP 110 is signaled to be setup between the ingress edge router 102a' and the egress edge router 102b' then the associated MEPs 112a and 112b would also be automatically established in accordance with an embodiment of the present invention. In this embodiment, to configure MEPs 112a and 112b some parameters are provided to enable the Ethernet OAM functions. First, the desired CCM interval is specified by the management system 104 based on service requirements or operator policy. Second, the MEPs 112a and 112b have to be aware of their own reachability parameters and the reachability parameters of the remote MEP, in order for the CCM messages to be sent and received. That is, when configuring a MEP 112a (for example), the CCM interval, the local MAC address and the VID over which the data plane traffic and CCM messages are received, along with the remote side MAC address and VID of the remote MEP 112b (for example) at which the data plane traffic and CCM messages are sent have to be known.

Figure 2:
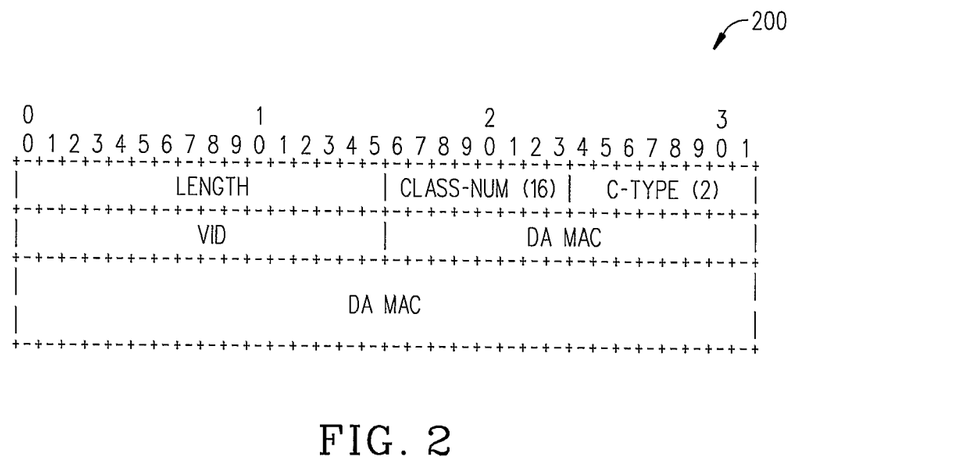
FIG. 2 is a diagram of an Ethernet Label located within a PATH message which is sent from an ingress edge node to an egress edge node in accordance with the present invention.
Figure 3:
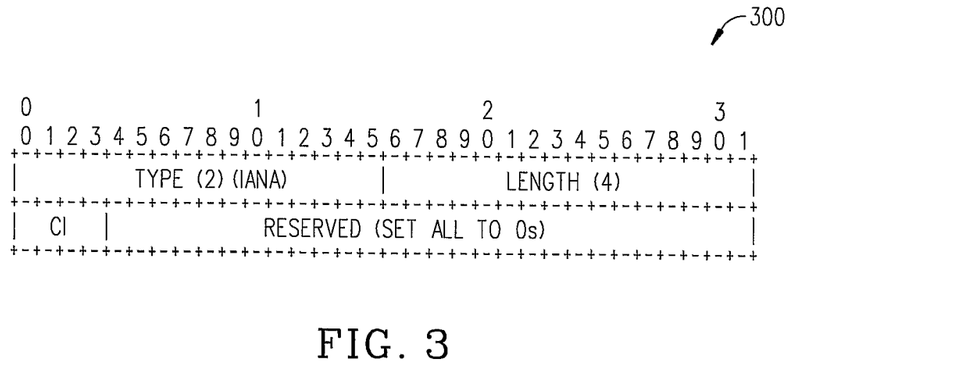
FIG. 3 is a diagram of a CFM TLV located within a PATH message which is sent from the ingress edge node to the egress edge node in accordance with an embodiment of the present invention.

The Ethernet Label 200 as defined in [Fedyk-GELS] (reference no. 1) includes the Destination MAC address (DA-MAC) and VID (see FIG. 2). Hence, the necessary reachability parameters for the MEPs 112a and 112b can be obtained from Ethernet Labels 200. Assuming, the procedures described in [Fedyk-GELS] for bidirectional Ethernet LSP 110 establishment are followed then the configuration of the MEPs 112a and 112b could be as follows in accordance with an embodiment of the present invention. When the RSVP-TE signalling is initiated for the bidirectional Ethernet LSP 110 the ingress edge router 102a' (initiator node 102a') creates an upstream label from its MAC address and locally selected VID and then generates a path message 114 (see FIG. 1). Once the egress edge router 102b' (remote node 102b') receives the path message 114 it can use the upstream label to extract the reachability information of the ingress edge router 102a'. Then, the egress edge router 102b' determines the MAC address and VID it would like to use to receive the traffic. These parameters determine the reachability information of the local MEP 112b. The only information that is missing to setup the MEP 112b, is the CCM interval, which is signaled in a new CFM TLV 300 (the Ethernet CFM TLV 300) in accordance with this embodiment of the present invention as specified below. Using this information from the CFM TLV 300 in the path message 114, the egress edge router 102b' can configure the MEP 112b. Next, the egress edge router 102b' uses the reachability information of MEP 112b to construct an Ethernet Label 200 to be put into a Resv message 116 that is sent to the ingress edge router 102a'. Once the Resv message 116 successfully arrives to the ingress edge router 102a' it can extract the remote side reachability information from the Ethernet Label 200, where the ingress edge router 102a' at this point has also obtained all of the information needed to establish the MEP 112a.

FIG. 3 illustrates an exemplary CFM TLV 300 which accommodates the information about the CCM interval and also leaves room for further extensions. As can be seen, the CFM TLV 300 includes a type field which indicates a new type (2) (IANA to define), the length field which is set to 4 bytes, and the value of CCM interval which is coded into the first three bits of the CCM Interval field (CI) by using the CCM interval field encoding scheme shown in TABLE #1 and defined in the standard Ethernet OAM (see reference no. 4 [IEEE-CFM]). In this embodiment, the CFM TLV 300 is typically sent in the LSP_ATTRIBUTE objects instead of the LSP_REQUIRED_ATTRIBUTES objects within both the PATH message 114 and in the RESV message 116). This is because a message with the LSP_REQUIRED_AT-TRIBUTES object has to be processed by all the routers 102' and 102" while a message with the LSP_ATTRIBUTE object are only required to be processed by the edge routers 102' and the core routers 102" can pass on the information transparently.

In this embodiment, the ingress edge router 102a' typically places the CFM interval field in the PATH message 114 to indicate the required value to be set for the monitoring of the LSP 110. While, the CFM interval field value in the RESV message 116 indicates the CFM interval that is to be set by the egress edge router 102b' (e.g., LER 102b') located at the tail end of the LSP 110. The ingress edge router 102a' upon receipt of the RESV message 116 can determine whether the egress edge router 102b' set the same interval that was requested or of it proposed a different and usually slower rate. If acceptable, then the ingress edge router 102a' sets the rate received in the RESV message 116 otherwise it initiates the tear down of the LSP 110. At the end, both the ingress edge router 102a' and the egress edge router 102b' each should use the same CCM interval. This negotiation allows an accounting for the processing load posed on the interfaces of the ingress edge router 102a' and the egress edge router 102b' to process the various CCM messages. The ingress edge router 102a' and the egress edge router 102b' can each consider the current CCM load (determined by the number of active CCM flows and their respective CCM intervals) when deciding to setup a new MEP 112a and 112b with a given CCM interval. This negotiation also allows a sort of admission/load control on the Continuity Check functionality since it is possible for the egress bridge node 102b' to reject a small CCM interval request (e.g., 3.3 ms) and propose a new less frequent rate for connectivity monitoring (e.g. 100 ms).

This solution is desirable because: (1) it supports the signalling of the CFM interval; (2) it leaves room for future extensions for signalling other CFM parameters, e.g. MA name or MEP ID within the CFM TLV 300; (3) it allows automatic configuration of the parameters of connectivity monitoring that are piggybacked on the LSP setup signalling; and (4) it allows the negotiation of the CCM monitoring interval and with this negotiation the OAM processing load posed on ingress edge bridge 102a' and the egress edge bridge 102b' can be controlled.

Embodiment No. 3

As an alternative to the solution provided in embodiment no. 2, the present invention can also allow the signalling of LSP attributes in the Attributes Flags TLV. In this case, the same three bits of the CCM Interval Field that are proposed in embodiment no. 2 would be transferred as flags of the Attributes Flags TLV instead of in the new CFM TLV 300. This solution has a drawback in that the bits in the Attributes Flags TLV do not leave room for future extensions to the CFM parameter provisioning.

Embodiment No. 4

In this embodiment, RSVP Notify messages which are sent after the LSP 110 has been set-up could be used for provisioning CFM connectivity monitoring. Originally, Notify messages were defined for fault notifications as described in [RFC3473] (reference no. 8). Recently, there has been a proposal to use Notify messages for communication between edge bridge routers 102' as described in [RFC4974] (reference 9). This embodiment uses a similar approach to enable the CFM provisioning. In particular, upon reception of an RESV message 116, the ingress edge bridge 102a' (e.g., ingress LER 102a') could send a Notify message 120 with new RSVP-TE extensions to the egress edge bridge 102b' (e.g., egress LER 102b') and the egress edge bridge 102b' could respond with a Notify message 122 containing new RSVP-TE extensions which is received by the ingress edge bridge 102a'.

To provision the CFM functionality using these Notify messages 120 and 122, the following RSVP-TE extensions could be used: (1) in the ADMIN_STATUS object, a bit is assigned to signal that the Notify message 120 or 122 is used for CFM provisioning; (2) a new CFM object is defined and added to the <notify session> sequence to signal the same information which was used in the CFM TLV 300 associated with embodiment no. 2 (note: it might be allowed that the LSP_ATTRIBUTE and LSP_REQUIRED_ATTRIBUTES objects could be carried in the Notify messages 120 and 122 to signal LSP attributes that need only processing at the edge bridges 102' but this would require an extension to [RFC3473] (reference no. 8)); and (3) the ERROR SPEC object is not relevant in case of CFM provisioning, and as such would carry an Error Code zero ("Confirmation") to indicate that there is no error.

The benefit of this solution is that only the edge nodes 102' are taking part in the signalling and the core nodes 102" are unaffected by the provisioning of the Continuity Check functionality. However, this particular solution has some drawbacks as follows: (1) it requires two additional signalling phases after setting-up the LSP 110 to provision the connectivity monitoring; and (2) it does not provide the additional functionalities that are possible with the solutions associated with embodiment nos. 2 and 5.

Embodiment No. 5

In this particular embodiment, Ethernet OAM [IEEE-CFM] aspects are used that are relevant for the connectivity monitoring of point-to-point PBB-TE connections 110. In IEEE these PBB-TE connections are unidirectional ESPs 110 while the term unidirectional LSPs 110 is used to identify general unidirectional connections. The present invention addresses both types of connections and other connections as well since it is also applicable to other technologies like MPLS add SDH in addition to the Ethernet technology.

The PBB-TE standard (reference no. 5) defines point-to-point ESPs 110 as a provisioned traffic engineered unidirectional connectivity, which is identified by the 3-tuple [ESP-MAC DA, ESP-MAC SA, ESP-VID] where the ESP-MAC DA is a MAC individual address, the ESP-MAC SA is a MAC individual address, and the ESP-VID is a VLAN identifier allocated for explicitly routed connections. To form a bidirectional PBB-TE connection 110 two co-routed point-to-point ESPs 110 are combined. The combined ESPs 110 have the same ESP-MAC addresses but may have different ESP-VIDs. Although it is possible to use GMPLS to setup a single unidirectional ESP 110, the Ethernet OAM mechanisms are only fully functional when bidirectional connections 110 are established with co-routed ESPs 110.

At both ends of the P2P bidiretional PBB-TE connection 110 there are configured the MEPs 112a and 112b. The MEPs 112a and 112b monitor the PBB-TE connection 110 and are configured with the same MD Level and MAID. Each MEP 112a and 112b has a unique identifier, the MEP ID. Besides these identifiers each MEP 112a and 112b that is monitoring a bidirectional PBB-TE connection 110 is provisioned with 3-tuples [ESP-MAC DA, ESP-MAC SA, ESP-VID]. As described above, the MEPs 112a and 112b periodically exchange CCMs at fixed intervals where eight distinct intervals have been defined in the IEEE-CFM standard (reference no. 4)(see TABLE #1).

In this embodiment, to simplify the configuration of connectivity monitoring, when an Ethernet ESP 110 or regular LSP 110 is signalled then the associated MEPs 112a and 112b should be automatically established. Furthermore, this embodiment can use GMPLS signalling to enable/disable the connectivity monitoring of a particular Ethernet LSP 110. As discussed in more detail below, to monitor an Ethernet LSP 110 in this embodiment the following set of parameters would be provided to setup the associated MEPs 112a and 112b:

A unique MAID is allocated for the PBB-TE connection 110 and both MEPs 112a and 112b are configured with the same information. The MAID includes a MD Name and a Short MA Name. Various formatting rules for these names have been defined by the IEEE-CFM standard (reference no. 4). Since, this information is also carried in all CC Messages, the combined length of the names will be limited to 44 bytes.

The MD Level allows hierarchical separation of monitoring entities. The IEEE-CFM standard (reference no. 4) allows the differentiation of 8 levels.

Each MEP 112a and 112b is provisioned with a MEP ID. The MEP ID uniquely identifies a given MEP 112a or 112b within a Maintenance Association. That is, the combination of MAID and MEP ID uniquely identify the corresponding MEP 112a or 112b.

The desired CCM Interval is specified by the management system 104 based on service requirements or operator policy.

MEPs 112a and 112b are aware of their own reachability parameters and the reachability parameters of their corresponding remote MEP. In the case of the bidirectional P2P PBB-TE connection 110 this requires that the 3-tuples [ESP-MAC A, ESP-MAC B, ESP-VID1] and [ESP-MAC B, ESP-MAC A, ESP-VID2] are configured in each MEP 112a and 112b. The GMPLS Ethernet Label 200 as defined in [Fedyk-GELS-PBBTE] (reference no. 1) includes the ESP-MAC DA and ESP-VID (see FIG. 2). Hence the necessary reachability parameters for the MEPs 112a and 112b can be obtained from Ethernet Labels 200 (i.e., carried in the downstream and upstream labels).

Assuming the procedures described in [Fedyk-GELS-PBBTE] (reference no. 1) are followed for the bidirectional Ethernet LSP 110 establishment then the MEP 112a and 112b configuration should be as follows in accordance with this embodiment of the present invention. When the RSVP-TE signalling is initiated for the bidirectional Ethernet LSP 110 the ingress bride node 102a' (local node 102a') generates a Path message 114 (see FIG. 1) and then:

Allocates an Upstream Label 200 from its MAC address (ESP-MAC A) and locally selected VID (ESP-VID1) (see FIG. 2).

Inserts an Ethernet OAM Configuration TLV 400 in the LSP_ATTRIBUTES object, specifying the CCM Interval and MD Level. This new Ethernet OAM Configuration TLV 400 is described in greater detail below with respect to FIG. 4.

Figure 4:
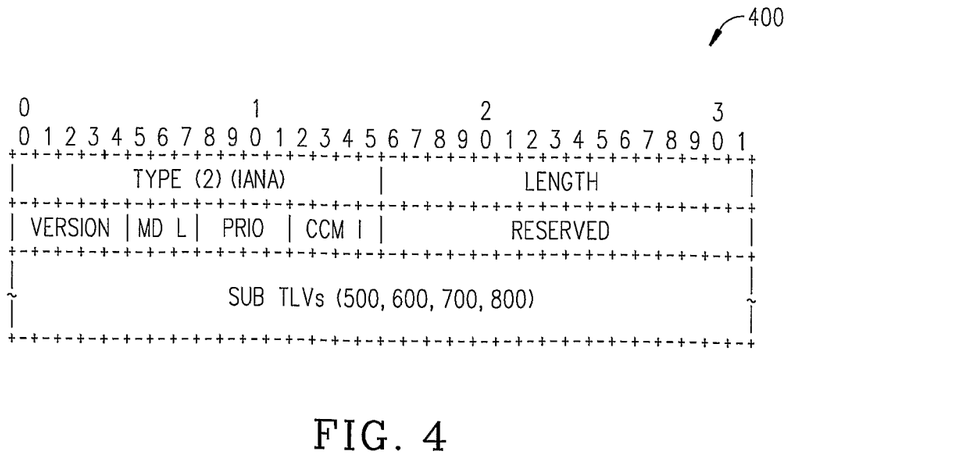
FIG. 4 is a diagram of an Ethernet OAM Configuration TLV located within a PATH message which is sent from the ingress edge node to the egress edge node in accordance with an embodiment of the present invention.

Adds an MD Name Sub-TLV 500 and a Short MA Name Sub-TLV 600 to the Ethernet OAM Configuration TLV 400, that will unambiguously identify a Maintenance Association for the specific PBB-TE connection 100 (note: the values for these parameters could also be derived from the GMPLS LSP identification parameters). The new MD Name Sub-TLV 500 and new Short MA Name Sub-TLV 600 are described in greater detail below with respect to FIGS. 5-6.

Adds a MEP ID Sub-TLV 700a/700b to the new Ethernet OAM Configuration TLV 400. Two distinct integer values are selected to identify the local and remote MEPs 112a and 112b within the Maintenance Association that was created for the Ethernet OAM monitoring of the point-to-point PBB-TE connection 110. The new MEP ID Sub-TLV 700a/700b are described in greater detail below with respect to FIGS. 7A and 7B.

Once the egress bridge node 102b' (remote node 102b') receives the Path message 114 it can use the UPSTREAM_LABEL to extract the reachability information of the ingress bridge node 102a' (initiator node 102a'). Then, the egress bridge node 102b' allocates a LABEL (which will be placed in the Resv message 116) by selecting the MAC address (ESP-MAC B) and VID (ESP-VID2) it would like to use to receive traffic. The ESP-MAC B and ESP-VID2 determine the reachability information of the local MEP 112b. In addition, the information received in the Ethernet OAM Configuration TLV 400 is also used to configure the local MEP 112b.

The egress bridge node 102b' then generates and sends the Resv message 116 (including the newly allocated LABEL) and once the ingress bridge node 102a' (initiator node 102a') successfully receives the Resv message 116 it can extract the remote side's reachability information from the LABEL object whereby the ingress bridge node 102a' has obtained all the information that is needed to establish its local MEP 112a. That is, the 3-tuples [ESP-MAC A, ESP-MAC B, ESP-VID1] and [ESP-MAC B, ESP-MAC A, ESP-VID2] can be derived by the ingress bridge node 102a' and the egress bridge node 102b' from the Ethernet Labels 200. Once the MEPs 112a and 112b are established then the monitoring of the LSP 110 is operational.

The following is a detailed description about the RSVP-TE extensions and in particular the new Ethernet OAM Configuration TLV 400 and it's associated TLVs 500, 600, and 700a/700b which are used in this embodiment of the present invention to help configure the MEPs 112a and 112b when setting-up the LSP 110. In RSVP-TE the Flags field of the SESSION_ATTRIBUTE object is used to indicate options and attributes of the LSP 110. The Flags field has 8 bits and hence is limited to differentiate only 8 options. However, the aforementioned RFC4420 (reference no. 10) also defines a new object for RSVP-TE messages to allow the signaling of arbitrary attribute parameters which makes RSVP-TB extensible to support new applications like the Ethernet OAM Configuration TLV 400 associated with this embodiment of the present invention. Furthermore, the RFC4420 allows options and attributes that do not need to be acted on by all routers 102 (e.g., LSRs 102) along the path of the LSP 100. These options and attributes may apply only to key routers 102 on the LSP 110 path such as the ingress bridge router 102a' (ingress LSR 102a') and the egress bridge router 102b'

(egress LSR 102b'). Thus, the options and attributes can be signalled transparently, and only examined at those points that need to act on them such as the ingress bridge router 102a' and the egress bridge router 102b'.

In implementing this embodiment, the ingress bridge router 102a' and the egress bridge router 102b' could use either the LSP_ATTRIBUTES object or the LSP_REQUIRED_ATTRIBUTES object defined in RFC4420 to provide a means to signal LSP attributes and options in the form of TLVs (note: the Attributes Flags TLV is the only TLV that is currently defined in RFC4420). The options and attributes signaled in the LSP_ATTRIBUTES object can be passed transparently through routers 102 (LSRs 102) not supporting a particular option or attribute, while the contents of the LSP_REQUIRED_ATTRIBUTES object are examined and processed by each router 102 (LSR 102). Since, the extensions defined for CFM Continuity Check are to be processed only by the ingress bridge router 102a' and the egress bridge router 102b' while internal nodes 102" need to pass on the information transparently, the LSP_ATTRIBUTES object is the one chosen to carry the new TLV for Ethernet OAM configuration information signaling.

The new Ethernet OAM Configuration TLV 400 (depicted in FIG. 4) has been defined to support the CFM setup of Ethernet LSPs 110 in accordance with this embodiment of the present invention. The Ethernet OAM Configuration TLV 400 can be carried in the LSP_ATTRIBUTES object in the Path message 114. The new Ethernet OAM Configuration TLV 400 accommodates information on the CCM interval and also carries the aforementioned new sub-TLVs namely the MD Name Sub-TLV 500, the Short MA Name Sub-TLV 600, and the MEP ID Sub-TLV 700a/700b. If the Ethernet OAM Configuration TLV 400 is included in the LSP_ATTRIBUTES object then this signals the request that MEPs 112a and 112b should be established for the LSP 110. If the MEPs 112a and 112b cannot be established, due to any reason, then an error is to be generated.

The Ethernet OAM Configuration TLV 400 shown in FIG. 4 has the following fields: (1) "type (2)" which indicates a new type namely the Ethernet OAM Configuration TLV 400; (2) "length" which indicates the total length including the sub-TLVs 500, 600 and 700a/700b; (3) "version" which identifies the CFM protocol version according to IEEE-CFM (reference no. 4); (4) "MD Level" which indicates the desired MD Level (the IEEE-CFM standard defines the different MD levels); and (5) "CCM Interval" which identifies the desired CCM Interval, according to the 3 bit encoding outlined in the IEEE-CFM standard (TABLE #1).

Figure 5:
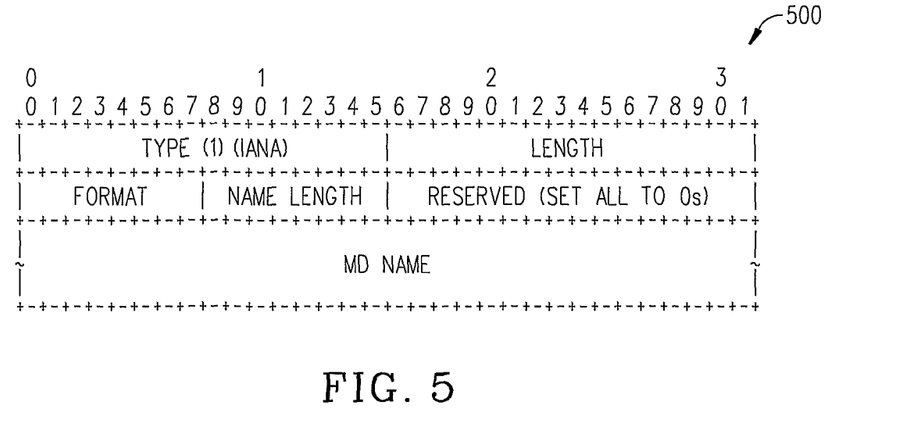
FIG. 5 is a diagram of a MD Name Sub-TLV which is located within the Ethernet OAM Configuration TLV in accordance with an embodiment of the present invention.
Figure 6:
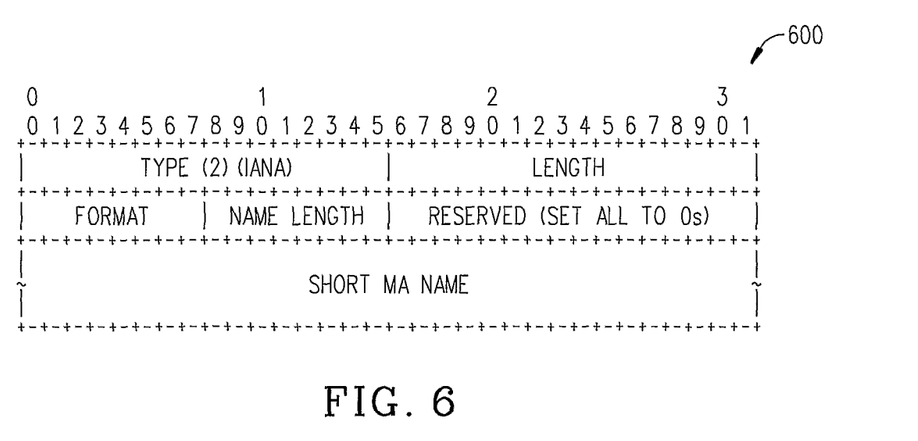
FIG. 6 is a diagram of a Short MA Name Sub-TLV which is located within the Ethernet OAM Configuration TLV in accordance with an embodiment of the present invention.

The MD Name Sub-TLV 500 shown in FIG. 5 has the following fields: (1) "type (1)" which indicates the MD Name Sub-TLV; (2) "format" which indicates this TLV is according to the IEEE-CFM standard (see reference no. 4); and (3) "MD Name" which indicates a variable length field that is formatted according to the format specified in the "format" field. If an undefined "format" is specified an error is to be generated. The Short MA Name Sub-TLV 600 shown in FIG. 6 has the following fields: (1) "type (2)" which indicates the Short MA Name Sub-TLV; (2) "format" which indicates this TLV is according to the IEEE-CFM standard (reference no. 4); and (3) "Short MA Name" which indicates a variable length field formatted according to the format specified in the "format" field. If an undefined "format" is specified an error is to be generated. Also, the combined length of the MD Name and the Short MA Name should be less or equal to 44 bytes, and if this is violated then an error should be generated.

Figure 7A:
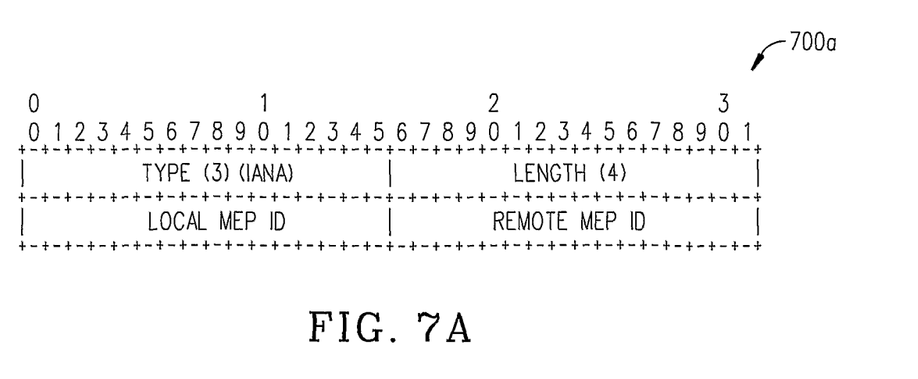
FIG. 7A is a diagram of a MEP ID Sub-TLV which is located within the Ethernet OAM Configuration TLV in accordance with an embodiment of the present invention.

The MEP ID Sub-TLV 700a shown in FIG. 7A has the following fields: (1) "type (3)" which indicates the MEP ID Sub-TLV; (2) "local MEP ID" which is a 16 bit integer value of the MEP ID for the MEP 112a on the initiator side (ingress bridge node 102a'); and (3) "remote MEP ID" which is a 16 bit integer value of the MEP ID to be set for the MEP 112b established at the receiving side (egress bridge node 102b'). The "remote MEP ID" value is determined by the initiator node (ingress bridge node 102a') which is possible since a new MAID is assigned to each PBB-TE connection 110 and the MEP IDs need only to be unique within the scope of the MAID.

Figure 7B:
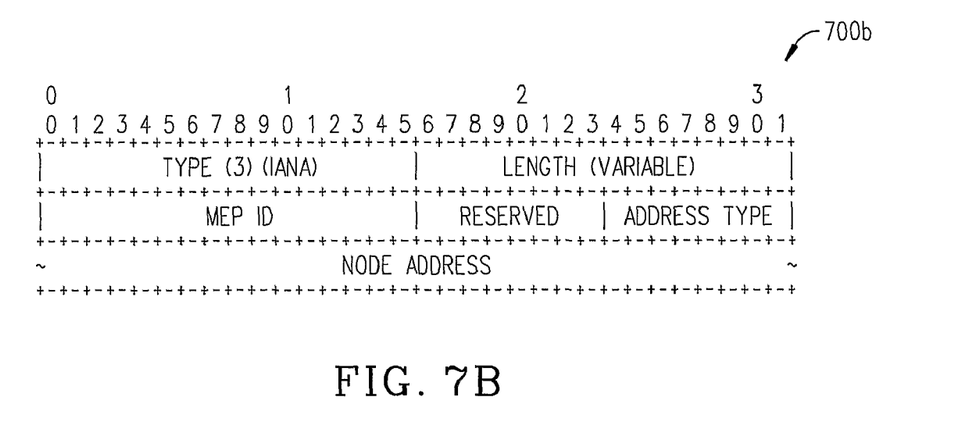
FIG. 7B is a diagram of an alternative MEP ID Sub-TLV which is located within the Ethernet OAM Configuration TLV in accordance with an embodiment of the present invention.

In the case, where the connection 110 is a point-to-multipoint connection then an alternative MEP ID Sub-TLV 700b could be used. An exemplary MEP ID Sub-TLV 700b is shown in FIG. 7B which has the following fields: (1) "type (3)" which indicates the MEP ID Sub-TLV; (2) "MEP ID" which is a 16 bit integer value of the MEP ID for the MEP 112a on the initiator side (ingress bridge node 102a'); (3) "address type" which indicates the type of address used for the node 102a' or 102b' (e.g., ipv4, ipv6); and (4) "node address" which indicates the IP address of the node 102a' or 102b' on which the MEP is defined. There could be as many instances of this MEP ID Sub-TLV 700b as required. In the P2P case, there would be two, one for the egress bridge node 102b' and for the ingress bridge node 102a'. In the P2MP case, there would be one for the root node and one for each leaf node signaled in the same PATH message.

Figure 8:
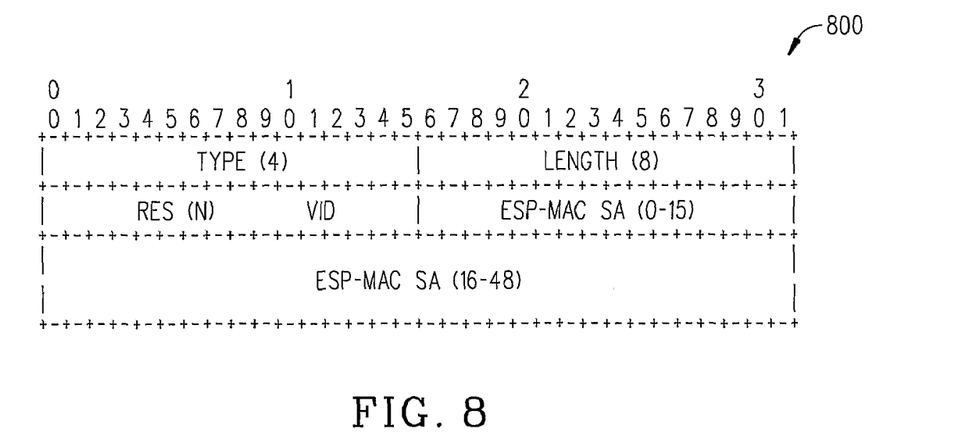
FIG. 8 is a diagram of a Control Channel Identification Sub-TLV which is located within the Ethernet OAM Configuration TLV in accordance with an embodiment of the present invention.

As mentioned above, this embodiment can also be used to establish Ethernet OAM functionality for a unidirectional ESP 100 (unidirectional LSP 100). To enable this feature, the new Ethernet OAM Ethernet OAM Configuration TLV 400 would contain a new Control Channel Identification Sub-TLV 800 which is used to support unidirectional failure detection. In the unidirectional case the ESP-MAC SA part of the 3-tuple [ESP-MAC DA, ESP-MAC SA, ESP-VID] cannot be determined from the Ethernet Labels 200, since there is no UPSTREAM_LABEL (allocated by the ingress bridge node 102a') that would carry this particular information to the ingress bridge node 102b'. Hence, the Control Channel Identification Sub_TLV 800 is used to provide the ESP-SA to allow proper configuration of the tail-end MEP 112b at the egress bridge node 102b'.

Also in the unidirectional case, there is no return path for the CFM messages to be sent back to the ingress edge node 102a' and to address this problem two exemplary options are described next. First, a data plane failure can be detected by and indicated by the egress bridge node 102b' (tail-end node 102b') by some other means such as, e.g., control plane signaling or management plane, which can be used for failure notifications and if desired the handling of failures. Second, an independent control channel can be maintained to return CFM messages to the ingress bridge node 102a' (head-end node 102a'). In the second case, a dedicated VLAN can identify the control channel and this dedicated VLAN can be pre-configured or may be signaled within the new Control Channel Identification Sub-TLV 800. To explicitly indicate if there is a control channel on which return CFM messages should sent a Notify (N) bit can be defined where if N is set then a VID is specified identifying the control channel. This second case is shown in FIG. 8. It should be appreciated that in an unidirectional case the MEPs 112a and 112b are configured differently than in a bidirectional case where both MEPs 112a and 112b are sending and expecting to receive CCMs but in the unidirectional case the source MEP 112a is configured to send CCMs but does not expect to receive CCMs and the sink MEP 112b is expecting to receive CCMs but not send CCMs.

The Control Channel Identification Sub-TLV 800 which is shown in FIG. 8 has the following fields: (1) "type (4)" which indicates the Control Channel Identification Sub-TLV; (2) "Notify (N) bit" where if the N bit is set then a VID is specified identifying the control channel; (3) "VID" which indicates the VLAN ID of the control channel; and (4) "ESP-MAC SA" which indicates the ESP-MAC SA of the unidirectional point-to-point ESP 110.

From the foregoing, it can be appreciated that the present invention provides an edge node 102*a* which includes a processor 130 and a memory 132 that stores processor-executable instructions where the processor 130 interfaces with the memory 132 and executes the processor-executable instructions to extend the connection setup procedures used to establish a connection 110 with a remote edge node 102*b*' to also provision a connectivity check functionality by establishing therein a first connectivity check mechanism 112*a* (e.g., first MEP 112*a*) and by enabling the remote edge node 102*b*' to establish a second connectivity check mechanism 112*b* (e.g., second MEP 112*b*) where the first connectivity check mechanism 112*a* and the second connectivity check mechanism 112*b* are used to monitor a connectivity of the connection 110 with the remote edge node 102*b*'. The extension of the connection setup procedures allows for the automatic configuration of parameters used to establish the connectivity check mechanisms to be piggybacked on the connection setup signaling between the edge node 102*a*' and the remote edge node 102*b*'.

Also, it can be appreciated that the present invention provides a network 100 including an ingress edge node 102*a*' and an egress edge node 102*b*' where the ingress edge node 102*a*' includes a processor 130 and a memory 132 that stores processor-executable instructions wherein the processor 130 interfaces with the memory 132 and executes the processor-executable instructions to extend the connection setup procedures used to establish a connection 110 with the egress edge node 102*b*' to also provision a connectivity check functionality by establishing therein a first connectivity check mechanism 112*a* (e.g., first MEP 112*a*). The egress edge node 102*b*' includes a processor 134 and a memory 136 that stores processor-executable instructions wherein the processor 134 interfaces with the memory 136 and executes the processor-executable instructions to interact with the ingress edge node 102*a*' to establish therein a second connectivity check mechanism 112*b* (e.g., second MEP 112*b*), where the first connectivity check mechanism 112*a* and the second connectivity check mechanism 112*b* are used to monitor a connectivity of the connection 110 between the ingress edge node 102*a*' and the egress edge node 102*b*'. The extension of the connection setup procedures allows for the automatic configuration of parameters used to establish the connectivity check mechanisms to be piggybacked on the connection setup signaling between the ingress edge node 102*a*' and the egress edge node 102*b*'.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the spirit of the invention as set forth and defined by the following claims.

The invention claimed is:

1. A method for setting-up connectivity monitoring of a connection between a first edge node and a second edge node in a network, said method comprising the steps of:

extending connection setup procedures used to establish the connection between the first edge node and the second edge node to also provision an Operations, Administration, and Maintenance (OAM) functionality by establishing a first OAM entity at the first edge node and a second OAM entity at the second edge node, where the first OAM entity and the second OAM entity are used to monitor a health of the connection between the first edge node and the second edge node, and wherein establishing the first OAM entity and the second OAM entity comprises exchanging messages between the first edge node and the second edge node, each message containing an object with a Type-Length-Value (TLV) defined for OAM configuration, wherein the TLV has a connectivity interval field in which there is coded a value of a connectivity check interval, and wherein the first edge node uses at least the received connectivity check interval to establish the first OAM entity and the second edge node uses at least the received connectivity check interval to establish the second OAM entity.

2. The method of claim 1, wherein said step of establishing the first and second OAM entities further comprises steps of implicitly signalling a connectivity check interval, enabled from the first edge node to the second edge node and then enabling the second edge node to use at least a default interval to establish the second OAM entity.

3. The method of claim 1, wherein said step of establishing the first and second OAM entities further comprises a step of exchanging messages between the first edge node and the second edge node, where each message contains an attribute object with an Attribute Flags Type-Length-Value (TLV) that has flags indicating a value of a connectivity check interval, where the first edge node uses at least the received interval to establish the first OAM entity and the second edge node uses at least the received interval to establish the second OAM entity.

4. The method of claim 1, wherein said step of establishing the first and second OAM entities further comprises a step of exchanging notify messages, after the setup of the connection, between the first edge node and the second edge node, where each notify message is used for OAM configuration and has an object including a connectivity interval field in which there is coded a value of a connectivity check interval, where the first edge node uses at least the received interval to establish the first OAM entity and the second edge node uses at least the received interval to establish the second OAM entity.

5. The method of claim 1, wherein said step of establishing the first and second OAM entities further comprises steps of:

sending a first message from the first edge node to the second edge node, where the first message contains reachability parameters of the first edge node and an attribute object with an Type-Length-Value (TLV) defined for OAM configuration where the TLV has a connectivity check interval and a Maintenance Domain (MD) level and the TLV further includes Sub-TLVs which contain an MD name, a Short Maintenance Association (MA) Name, and a Maintenance End Point (MEP) ID for the second OAM entity, where the second edge node uses at least this information to establish the second OAM entity; and receiving a second message sent by the second edge node to the first edge node, where the second message contains reachability parameters of the second edge node, where the first edge node uses at least this information to establish the first OAM entity.

6. The method of claim 1, wherein said step of establishing further comprises a step of sending a first message from the first edge node to the second edge node, where the first message contains an attribute object with an Type-Length-Value (TLV) defined for OAM configuration where the TLV has a connectivity check interval and a Maintenance Domain (MD) level and the TLV further includes a Sub-TLV which contains a MD name, a Short Maintenance Association (MA) Name, and a Maintenance End Point (MEP) ID for the second OAM entity, and further contains information about a control channel to be used by the second edge node to return connectivity fault messages to the first edge node after the second edge node uses at least the information provided within the first message to establish the second OAM entity.

7. The method of claim 1, wherein said step of establishing the first and second OAM entities further comprises the steps of:
sending a first message from the first edge node to the second edge node, where the first message contains reachability information in a label, where the second edge node determines a Maintenance Association (MA) and a Maintenance End Point (MEP) identification using information about the connection, and then the second edge node uses the received reachability information, the MA, the MEP identification and a default connectivity check interval to establish the second OAM entity; and
receiving a second message from the second edge node at the first edge node, where the second message contains reachability information in a label, where the first edge node determines a Maintenance Association (MA) and a Maintenance End Point (MEP) identification using information about the connection, and then the first edge node uses the received reachability information, the MA, the MEP identification and the default interval to establish the first OAM entity.

8. The method of claim 1, wherein the connection is a unidirectional connection.

9. The method of claim 1, wherein the connection is a bidirectional connection.

10. The method of claim 1, wherein the connection is a point-to-multipoint connection.

11. An edge node, comprising:
a processor; and
a memory operable to store processor-executable instructions and, wherein the processor is operable to execute the processor-executable instructions to extend connection setup procedures used to establish a connection with a remote edge node to also provision an Operations, Administration, and Maintenance (OAM) functionality by establishing therein a first OAM entity where the first OAM entity is used to monitor a health of the connection with the remote edge node, and
wherein the processor is operable to establish the first OAM entity by exchanging, with the remote edge node, one or more messages containing an object with a Type-Length-Value (TLV) defined for OAM configuration, wherein the TLV has a connectivity interval field in which there is coded a value of a connectivity check interval, and
wherein the processor is further operable to use at least the received connectivity check interval to establish the first OAM entity.

12. The edge node of claim 11, wherein said processor uses Resource Reservation Protocol-Traffic Engineering (RSVP-TE) extensions when extending the connection setup procedures to also provision the OAM functionality and enable connectivity-performance monitoring of the connection with the remote edge node.

13. A network, comprising:
an ingress edge node;
an egress edge node;
said ingress edge node includes a processor and a memory operable to store processor-executable instructions, and wherein the processor is operable to execute the processor-executable instructions to extend connection setup procedures used to establish a connection with the egress edge node to also provision an Operations, Administration, and Maintenance (OAM) functionality by establishing therein a first OAM entity; and
said egress edge node includes a processor and a memory operable to store processor-executable instructions, and wherein the processor is operable to execute the processor-executable instructions to interact with the ingress edge node to establish therein a second OAM entity, where the first OAM entity and the second first OAM entity are used to monitor a health of the connection between the ingress edge node and the egress edge node,
wherein establishing the first OAM entity and the second OAM entity comprises exchanging messages between the ingress edge node and the egress edge node, each message containing an object with a Type-Length-Value (TLV) defined for OAM configuration, wherein the TLV has a connectivity interval field in which there is coded a value of a connectivity check interval, and
wherein the ingress edge node uses at least the received connectivity check interval to establish the first OAM entity and the egress edge node uses at least the received connectivity check interval to establish the second OAM entity.

14. The network of claim 13, wherein said ingress edge node uses Resource Reservation Protocol-Traffic Engineering (RSVP-TE) extensions when extending the connection setup procedures to also provision the OAM functionality and enable connectivity-performance monitoring of the connection between the ingress edge node and the egress edge node.

15. A method of operating an edge node to set up connectivity monitoring of a connection, comprising:
extending connection setup procedures used to establish a connection with a remote edge node to also provision an Operations, Administration, and Maintenance (OAM) functionality by establishing a first OAM entity, wherein the first OAM entity is used to monitor a health of the connection with the remote edge node, and
wherein establishing the first OAM entity comprises exchanging, with the remote edge node, one or more messages containing an object with a Type-Length-Value (TLV) defined for OAM configuration, wherein the TLV has a connectivity interval field in which there is coded a value of a connectivity check interval, and using at least the received connectivity check interval to establish the first OAM entity.

* * * * *

UNITED STATES PATENT AND TRADEMARK OFFICE
CERTIFICATE OF CORRECTION

PATENT NO. : 8,102,774 B2
APPLICATION NO. : 12/810228
DATED : January 24, 2012
INVENTOR(S) : Gerö et al.

It is certified that error appears in the above-identified patent and that said Letters Patent is hereby corrected as shown below:

On the Cover Page, item (75), under "Inventors", in Column 1, Line 3, delete "Laval (CA);" and insert -- Laval, QU (CA); --, therefor.

In Column 11, Line 8, delete "bidiretional" and insert -- bidirectional --, therefor.

In Column 12, Line 59, delete "RSVP-TB" and insert -- RSVP-TE --, therefor.

In Column 18, Line 24, in Claim 13, delete "second first OAM" and insert -- second OAM --, therefor.

Signed and Sealed this
Twenty-fourth Day of April, 2012

David J. Kappos
*Director of the United States Patent and Trademark Office*

UNITED STATES PATENT AND TRADEMARK OFFICE
CERTIFICATE OF CORRECTION

Page 1 of 1

PATENT NO.        : 8,102,774 B2
APPLICATION NO.   : 12/810228
DATED             : January 24, 2012
INVENTOR(S)       : Gerö et al.

It is certified that error appears in the above-identified patent and that said Letters Patent is hereby corrected as shown below:

In the Specification

In Column 4, Line 38, delete "102")." and insert -- 102". --, therefor.

In Column 5, Line 22, delete "TABLE #2" and insert -- TABLE #1 --, therefor.

In Column 5, Line 28, delete "TABLE #2" and insert -- TABLE #1 --, therefor.

In Column 6, Line 54, delete "LPSs 110," and insert -- LSPs 110, --, therefor.

In Column 14, Line 39, delete "ingress" and insert -- egress --, therefor.

In Column 15, Line 10, delete "102a" and insert -- 102a' --, therefor.

Signed and Sealed this
Eleventh Day of March, 2014

Michelle K. Lee
*Deputy Director of the United States Patent and Trademark Office*